UNITED STATES PATENT OFFICE.

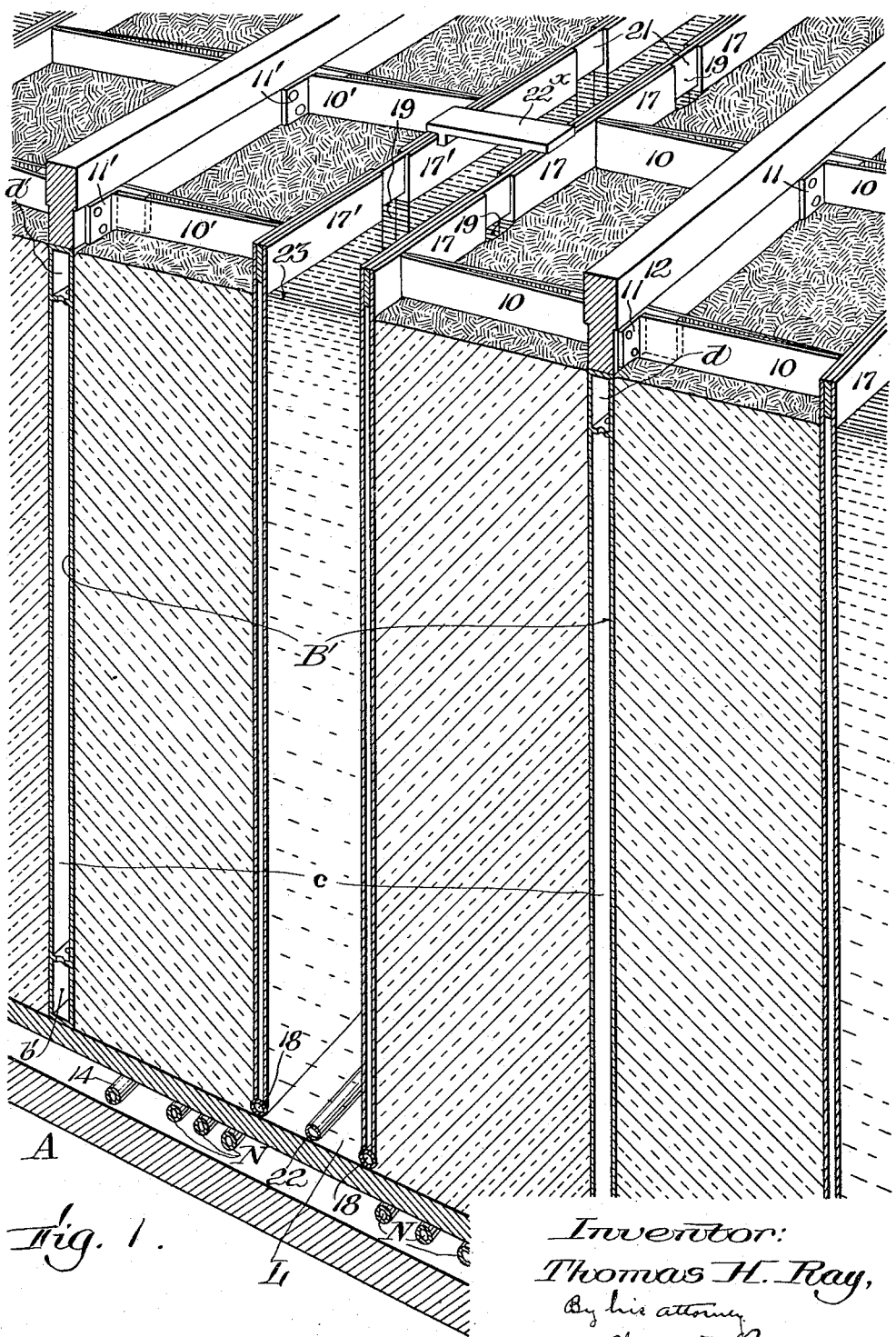

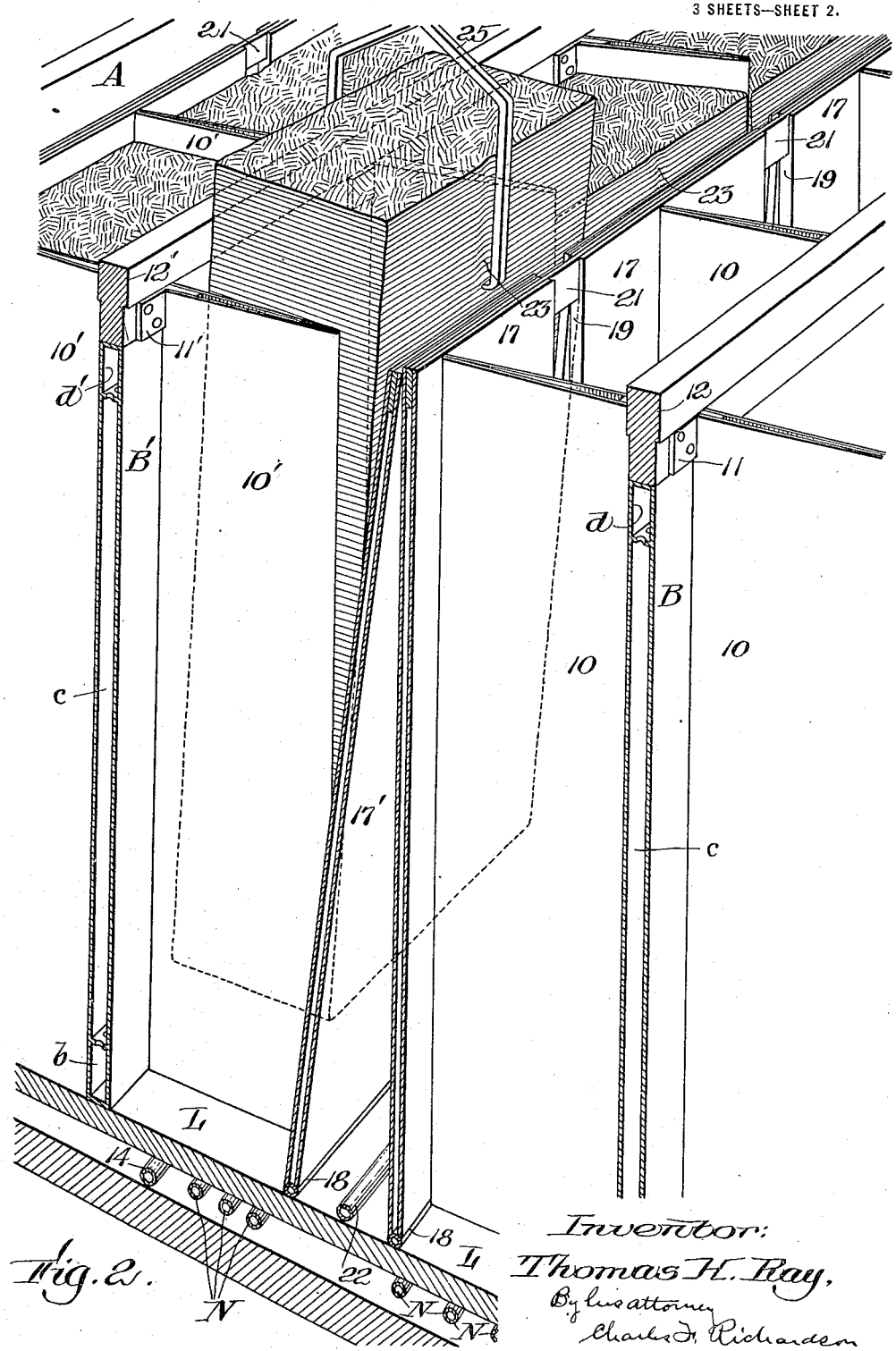

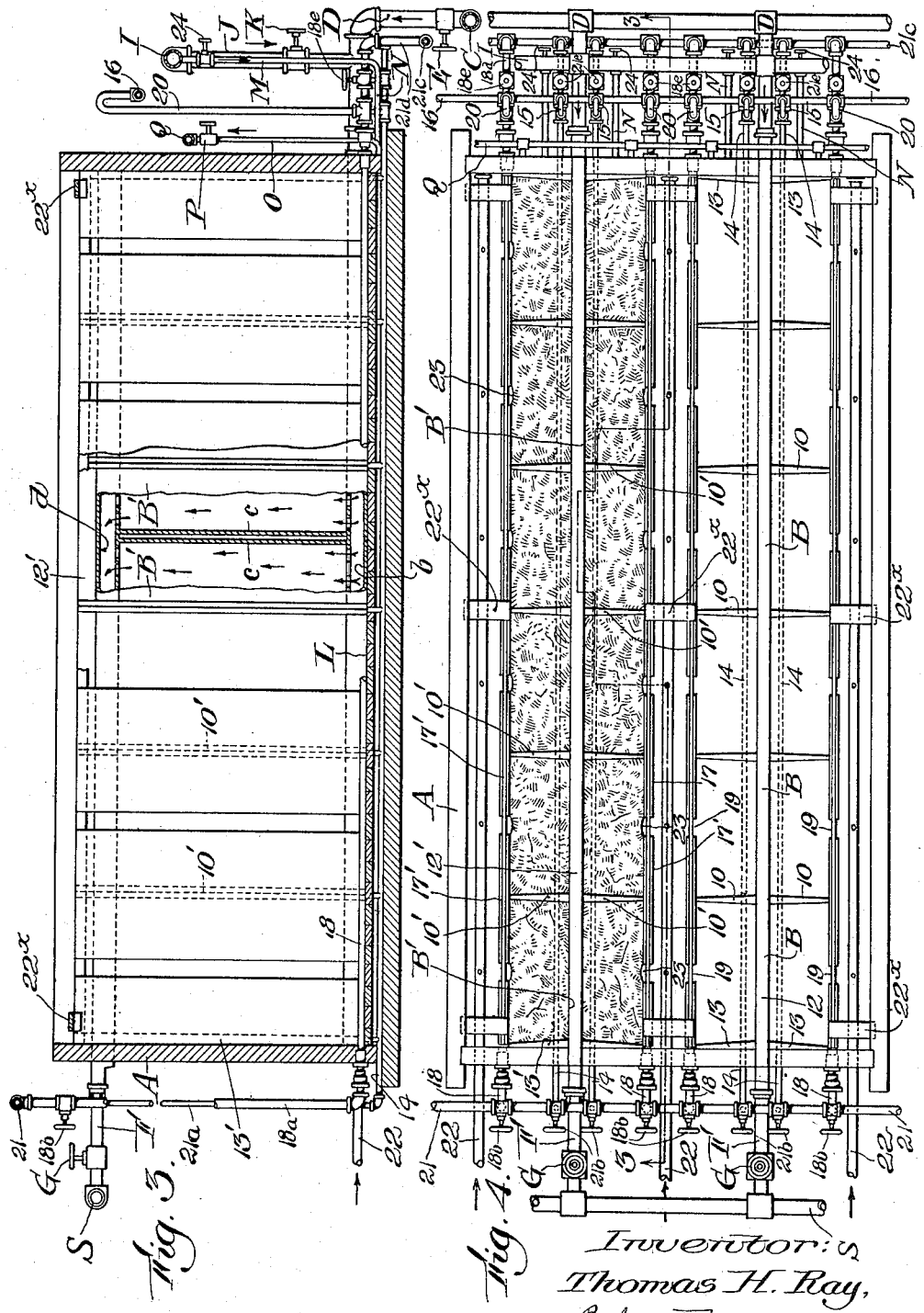

THOMAS H. RAY, OF SOMERVILLE, MASSACHUSETTS.

ICE-MAKING MACHINE.

1,219,773.

Specification of Letters Patent.   Patented Mar. 20, 1917.

Application filed June 26, 1916.   Serial No. 105,796.

*To all whom it may concern:*

Be it known that I, THOMAS H. RAY, a citizen of the United States, residing at Somerville, in the county of Middlesex and State of Massachusetts, have invented certain new and useful Improvements in Ice-Making Machines, of which the following is a specification, reference being had therein to the accompanying drawings.

The principal objects of my invention are to provide means

First, to obtain a perfect cake of ice, *i. e.* a substantially rectangular block of clear ice without a core.

Second, to reduce the time required for freezing and harvesting the ice, say, one-half over the method employed by any prior plate-system.

Third, to render the ice-forming means "fool-proof" by so designing the movable freezing plates that they cannot, while being handled, be left in improper freezing positions without being at once noticed by any man of ordinary intelligence.

These objects are attained by what I term a "block-plate-cell-system"; and by this term I mean an ice-machine which has a freezing-plate, two hollow metal-dividing-blades contacting said plate but at right angles thereto, the three forming three sides of a cell; and two hollow metal blades having a vertical space between them to permit agitation of the water within the cell, said blades being pivotally mounted, and, when moved into contact with said two dividing-blades, substantially forming the fourth side of the rectangular ice-forming cell; the bottom of said cell being the bottom of the water tank in which the ice-machine is mounted.

In the drawings illustrating the principle of my invention and the best mode now known to me of embodying the same in operative structure, Figure 1 is a perspective view of a section of a freezing-tank embodying my invention, wherein the ice is assumed to be about ready for harvesting.

Fig. 2 shows in perspective a portion of the freezing-tank with water withdrawn, with a pivoted ice-forming blade moved out of freezing position to allow a pair of tongs to be hitched on to a block of ice, for the purpose of lifting it out of the tank. It also shows my invention with parts in normal freezing position, some containing ice blocks, and others empty.

Figs. 3 and 4 are respectively an elevation and a plan; the elevation being a section on line 3—3, Fig. 4; all to make plain the construction of a suitable tank, and the ice-forming plate, dividing-blades, rocking ice-forming blades, and connections and piping for the refrigerant liquid, and for warm liquid for releasing the ice from the ice-forming surfaces.

A water tank A, Figs. 1 and 2, is provided with one or more lines of hollow ice-freezing plates B, B', Figs. 1, 2 and 3, such as disclosed and claimed in United States Letters Patent No. 1,077,916, issued to me November 4, 1913, for improvements in ice-making machine; and refrigerant medium, as ammonia, brine or other equivalent refrigerant, entering a bottom feed-header *b*, Fig. 3, and rising through the freezing plates *c*, and then out and away from a top return-header *d*, as shown in the sectioned portions of Fig. 3 and indicated by arrows. To furnish this supply of refrigerant, there are provided the well-known connections. For example, anhydrous ammonia being used as a refrigerant, there leads from a liquid-header C, Figs. 3 and 4, outside of the tank, a liquid-feed-pipe D with a valve E therein, which pipe is connected to the open end of the bottom feed-header *b*; while a return-pipe F with a valve G leads away from the open end of the top return-header *d*. For the purpose of harvesting the ice, hot gas may be properly introduced into each bottom-header *b* from a hot-gas-header I, outside of the tank, and having a gas feed-pipe J with a valve K opening into the liquid-feed-pipe D ahead of its valve E. To melt any ice that may freeze to the false floor L of the tank, a hot-gas-release-pipe M leads from the hot-gas-header I to one end of each hot-gas-coil N below the false floor, the other end of each coil being in turn connected by a pipe O with valve P, to a hot-gas return-header Q, also outside of the tank.

Adjacent to the edges of the plates, as B, or B', Fig. 2, forming a space between the plates, there is a hollow metallic dividing-blade 10, V-shaped in cross-section, and extending from the false floor L of the tank to a point above the top surface of the return-header *d* of the ice-freezing plates B.

This dividing blade 10 is provided with feet or flanges 11 bent into planes parallel with the planes of the main freezing plates B and headers $b$ and $d$, the rear edge of the blade being designed to be in intimate contact with the freezing surfaces of the main freezing plates and headers, where it is so held by means of bolts passing through the feet into a wooden sill 12 which is designed to support a tank cover, not shown, and in and to which the return head $d$ is likewise mounted and secured. A similar hollow ice dividing blade may be likewise mounted and secured in intimate contact with the opposite side of the main ice-freezing plates, as clearly appears from an inspection of Figs. 1, 2 and 4, it being understood, of course, that the number of ice-dividing blades may be duplicated to the extent desired. An end ice-dividing-blade 13 shown in Figs. 3 and 4, is to prevent the water adjacent to the wooden end of the tank from freezing thereto. Each of the dividing blades is connected with a hot liquid or water pipe 14, Fig. 4, lying between the bottom and the false bottom of the tank, and connected to a hot liquid or water feed-header 21, by a pipe $21^a$, having a valve $21^b$, Fig. 4, and to a main return liquid water-header $21^c$, by a pipe $21^d$ with a valve $21^e$; so that each dividing blade whenever desired, may be filled with the warm liquid or water, the level of the liquid being determined by an overflow standpipe 15 connected outside of the tank to the pipe 14, and to a header 16 which, by a pipe not shown, may return the water to its source of supply, through the main return water-header $21^c$.

It will be noticed that the ice-forming plates B, Fig. 2, and each adjacent dividing blade 10, form three of the four sides required for a rectangular ice-forming cell, and that they are rigid. Now to form the remaining or fourth side of the cell, I provide two hollow metallic movable ice-forming blades 17, pivoted at their bottoms to a pipe 18, mounted in suitable stuffing boxes and extending through the ends of the tank A, Figs. 3 and 4. This pipe, in a manner similar to hot liquid or water pipe 15, is connected to hot water feed-header 21, by a pipe $18^a$, Fig. 3, having a valve $18^b$, and to the main return water-header $21^c$ by a pipe $18^d$ having a valve $18^e$. These adjacent hollow blades are separated vertically by a space 19 to permit a proper agitation of water within the cell, by the moving water outside thereof, in the tank, during the process of freezing a block of ice. By means of this pipe 18, a warm liquid, as water, may be caused to flow through these movable ice-forming blades, in order to release any ice formed thereon. That the warm water may not rise above a certain level in these movable blades, a standing escape pipe 20, like the escape standpipe 15, is connected to the hot water feed header 21, and to the main return water-header $21^c$, outside of the tank; the top of the escape standpipes 15 and 20 being at the high water mark set in the dividing blades and the pivoted blades. It is also to be noticed that the number of cells may be extended, and that, in such event, the number of pivoted blades will have to be correspondingly increased; the axis of each line of pivoted blades being such that they may be simultaneously moved into or out of intimate contact with the adjacent edges of the stationary ice-forming blades; and these pivoted blades being connected together by a binding rod 21 extending throughout the length of the tank, and held in said intimate contact by lock-blocks $22^x$, which may be removed when it becomes necessary to move said pivoted blades away from said dividing blades and out of contact with them.

Arranged upon the top of the false floor of the tank, parallel with the pivotal axis of the rocking blades, is an agitation pipe 22 with a hole in its top, opposite the agitation slot or space 19 between the rocking blades 17 for each cell. By introducing air under pressure into this pipe, the water within each cell, during the process of freezing, is sufficiently stirred to force out through the agitation space, all impurities, that would otherwise be frozen into the ice block in each cell.

I will now explain the operation of my invention.

The tank A is filled with water up to the point 23, Fig. 1, and for the purpose of illustration, ice is to be formed by only the main freezing plates with their coöperating dividing blades and movable blades, as indicated in Fig. 4. Liquid ammonia from the liquid-header C passes to each bottom header $b$ of each freezing plate in the tank; the hot gas valves K being closed. The liquid ammonia fills the bottom blade-header $b$, expands, evaporates, producing intense cold, and under a reduced pressure, passes up through the hollow freezing plates $c, c$, and continues to the top header $d$, and on through return pipe F, and its valve G, into the return-header S.

The dividing blades 10', Figs. 1 and 4, and the pivoted blades 17' are empty, that is, they contain only air, the hot water valves $21^b$ and $18^b$ being closed, and the return water valves $21^e$ and $18^e$ being open. Heat begins to be absorbed from the main metal freezing plate B', the metal dividing blades 10', and the pivoted blades 17', they all being in contact; also the heat from the water next to these metal surfaces, is drawn away by conduction, and ice begins to form first, on the main plates, then on the dividing blades, and finally on the pivoted blades; but the ice is being formed all "one way," that is, the heat absorbed is all flowing back to the refrigerant in the main plates B'. The ice continues to form on all of the surfaces; all impurities in the water being taken care of by the agitation of the water through the space 19 being the adjacent pivoted blades. As the ice increases and approaches a solid block, the hollow space 23 in the ice, due to the agitated water, becomes less and less, and finally tends to disappear between the pivoted blades. But when this is about to happen, the block or blocks have the desired shape for harvesting, as shown in Figs. 1 and 4.

Sufficient ice having been formed, the liquid return valve G and the feed valve E, controlling the flow of ammonia, are closed and the ice allowed to "temper." The hot gas valve K is slightly opened, the hot gas entering the hollow freezing plates; next, the return valve G being sufficiently opened, the hot gas almost instantly melts the skin of ice attached to the ice main forming surface B'. At the same time, to sever the ice from the false floor, hot gas from the hot gas header I is permitted to flow through the hot gas releasing pipes N, by opening the hot gas valves 24. After this skin of ice is melted, the valves controlling the flow of hot gas for this purpose are closed. The water in the tank meanwhile having been drawn off, a warm liquid, as hot water, is introduced into the stationary dividing blades 10', and the pivoted blades 17', through their respective supply pipes 14, 18. To accomplish this the valves 21$^e$ and 18$^e$ are closed; and the valves 21$^b$ and 18$^b$ are opened. The hot water rises in the dividing blades and the pivoted blades until the water begins to escape through the bends of the standpipes 15 and 20, when the feed valves 18$^b$ and 21$^b$ are closed. After the warm water has accomplished its purpose, the escape valves 18$^e$ and 21$^e$ are opened, and the pivoted blades and dividing blades are emptied through the main return water-header 21$^c$. The blocks of ice thus become released from the ice-forming surfaces and the false floor; the lock blocks 22$^x$, Fig. 1, are removed; the pivoted blades are turned away from their respective blocks of ice, see Fig. 4, and by slightly tilting each block forward, as with a bar, a pair of tongs 25 may be slipped over the head of the block, for the purpose of quickly and easily whipping the block out of its cell and tank.

After the blocks of ice have been harvested, the pivoted blades are returned to, and locked by lock blocks, in normal freezing position, the tank filled with water, and the operation for freezing new blocks repeated.

My invention in its simplest form, is found in one cell, but its usefulness, of course, is immensely increased by increasing the number of cells.

Having described the construction and operation of a preferred form of it, and desiring to protect the same in the broadest manner legally possible,

What I claim is:

1. An ice-forming plate; two hollow metal dividing blades mounted upon and contacting said plate at right angles; two rocking hollow metal blades slightly separated from each other vertically, pivotally mounted at their bottom portions and adapted to be moved toward or away from said metal dividing blades, and into or out of contact with the adjacent edges of said blades.

2. An ice-forming plate; two ice-forming hollow metal dividing blades at right angles thereto, and in intimate contact therewith; two pivotally mounted ice-forming hollow metal blades having between them vertically a space to permit agitation of the water within the cell to be frozen, and adapted to move into or out of contact with the adjacent edges of the said hollow dividing blades to facilitate the removal of the ice, as by lifting, from between the cell-forming freezing surfaces; and suitable means for releasing the ice from each of said ice-forming surfaces.

3. An ice-forming plate; two hollow metal dividing blades fixed at right angles to said plate, and with said plate forming the three sides of an ice-forming cell; pipe connections with the bottom of each dividing blade whereby a warm medium may be introduced into and withdrawn from said blade; two hollow metal blades having an agitation space between them, pivotally mounted at their bottoms, and adapted to be moved toward or away from said ice-forming dividing blades, and into or out of contact with the adjacent edges of said two metal dividing blades fixed to said plate; and pipe connections with the bottom of said pivoted blades whereby a heated medium may be introduced and withdrawn from said pivoted blades; all designed to obtain all the objects of my invention.

In testimony whereof I hereunto affix my signature in the presence of two witnesses.

THOMAS H. RAY.

Witnesses:
A. I. CRAWFORD,
CHARLES F. RICHARDSON.